US007138939B2

(12) United States Patent  
Honda

(10) Patent No.: US 7,138,939 B2
(45) Date of Patent: Nov. 21, 2006

(54) RADAR

(75) Inventor: Kanako Honda, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/029,463

(22) Filed: Jan. 6, 2005

(65) Prior Publication Data

US 2005/0168378 A1 Aug. 4, 2005

(30) Foreign Application Priority Data

Jan. 9, 2004 (JP) ............................. 2004-004587

(51) Int. Cl.
*G01S 13/38* (2006.01)
*G01S 13/32* (2006.01)
*G01S 13/08* (2006.01)
*G01S 13/93* (2006.01)

(52) U.S. Cl. .................. 342/129; 342/70; 342/128; 342/130; 342/131; 342/134; 342/135; 342/175; 342/195

(58) Field of Classification Search ................ 342/27, 342/28, 70–72, 82–103, 118, 128–132, 175, 342/188–197, 134–137, 145; 180/167–169; 375/130–153

See application file for complete search history.

(56) References Cited

U.S. PATENT DOCUMENTS

| 3,896,434 A | * | 7/1975 | Sirven | 342/132 |
| 3,898,655 A | * | 8/1975 | Tesselt | 342/83 |
| 4,691,204 A | * | 9/1987 | Hiramoto | 342/134 |
| 4,851,852 A | * | 7/1989 | Bjorke et al. | 342/135 |
| 5,302,956 A | | 4/1994 | Asbury et al. | |
| 5,357,253 A | * | 10/1994 | Van Etten et al. | 342/131 |
| 5,402,129 A | * | 3/1995 | Gellner et al. | 342/70 |
| 5,828,333 A | * | 10/1998 | Richardson et al. | 342/70 |
| 5,923,280 A | * | 7/1999 | Farmer | 342/70 |
| 5,923,284 A | * | 7/1999 | Artis et al. | 342/129 |
| 6,028,548 A | * | 2/2000 | Farmer | 342/70 |

FOREIGN PATENT DOCUMENTS

| GB | 2 268 350 A | 1/1994 |
| JP | A 2002-511945 | 4/2002 |
| JP | A 2003-167048 | 6/2003 |
| WO | WO 99/01782 | 1/1999 |

OTHER PUBLICATIONS

Williams, "Millimetre Wave RADARS for Automotive Applications," IEEE MTT-S Digest, 1992, pp. 721-724.

* cited by examiner

*Primary Examiner*—Bernarr E. Gregory
(74) *Attorney, Agent, or Firm*—Oliff & Berridge, PLC

(57) ABSTRACT

A radar has a transmission section, a reception section that receives a reflected wave of the transmission wave, a transmission switch section, a delay section that delays a predetermined timing, a reception switching section, a difference processing section, and a calculation section. The transmission section switches between a first frequency and a second frequency to transmit a transmission wave having one of the frequencies. The transmission switch section switches between turning-on and turning-off of an operation of the transmission section at the predetermined timing. The reception switching section switches between turning-on and turning-off of an operation of the reception section according to the timing delayed. The difference processing section outputs a difference between the transmission wave and the reflected wave. The calculation section calculates a distance on a basis of a delay amount, when a detection waveform has a difference frequency between the first frequency and the second frequency.

7 Claims, 4 Drawing Sheets

RADAR

BACKGROUND OF THE INVENTION

1. Field of the Invention

This invention relates to a radar having a transmission section that switches between a first frequency and a second frequency to transmit a transmission wave having one of the first frequency and the second frequency and a reception section that receives a reflected wave of the transmission wave transmitted by the transmission section, and in particular to a radar that can measure a distance to an object with a simple configuration.

2. Description of the Related Art

Hitherto, various radars have been widely used for detecting an object and measuring a distance. For example, JP-A-2002-511945 discloses an art of switching between two frequencies, transmitting the resultant waveform as a transmission wave, receiving a reflected wave having a reception lag equal to or less than the limit lag corresponding to the limit distance, and measuring the distance.

U.S. Pat. No. 5,302,956 discloses a radar whose cost is reduced by simplifying the configuration so that a received reflected wave before signal processing is digitalized and the distance is measured by performing digital signal processing.

Further, JP-A-2003-167048 discloses an art of emitting a transmission signal every given time cycle and for a short time only and further modulating the signal of a local oscillation signal source input to a mixer of a reception section so as to change the frequency like sawteeth, thereby detecting the target of an object having relative speed zero and further separating a plurality of objects having the same relative speed.

SUMMARY OF THE INVENTION

By the way, in related art, in a two-frequency CW system radar for switching between two frequencies for transmission or transmitting two frequencies at the same time, the detection signal is the Doppler component of the reflected wave. In such a system for detecting the Doppler component, it is difficult to detect an object having no relative speed. Also, the speed to be detected changes with the speed of the object being measured and thus the configuration becomes complicated. These are problems.

Known as another radar is a spread spectrum radar for transmitting a spread spectrum signal using a spread code, inversely spreading the reflected wave using a delayed spread code, and calculating the distance from the delay amount. However, the spread spectrum radar requires a phase shifter and the high frequency portion becomes complicated. Further, if a Doppler component is superposed on the detection signal, it becomes difficult to design a filter in the detection signal processing portion at the later stage; this is a problem.

That is, the radar in the related art involves a problem of requiring a complicated circuit configuration in the detection-signal processing portion. It is important to simplify the configuration. Particularly, in recent years, the demand for installing a radar in a vehicle has been increased and there have been demands for a radar that can perform object detection and distance measurement with high accuracy if the relative speed is zero or a comparatively small value and can be manufactured at low cost.

Therefore, it is an object of the invention to provide a radar that can measure a distance with a simple configuration.

To the end, according to one embodiment of the invention, a radar has a transmission section, a reception section, a transmission switch section, a delay section, a reception switching section, a difference processing section, and a calculation section. The transmission section switches between a first frequency and a second frequency to transmit a transmission wave having one of the first frequency and the second frequency. The reception section receives a reflected wave of the transmission wave transmitted by the transmission section. The transmission switch section switches between turning-on and turning-off of an operation of the transmission section at a predetermined timing. The delay section delays the predetermined timing. The reception switching section switches between turning-on and turning-off of an operation of the reception section according to the timing delayed by the delay section. The difference processing section outputs a difference between the transmission wave and the reflected wave as a detection waveform. The calculation section calculates a distance to an object on a basis of a delay amount, which the delay section gives to the predetermined timing, when the detection waveform has a difference frequency between the first frequency and the second frequency.

Accordingly, the radar that can measure the distance with the simple configuration can be provided.

The predetermined timing may be generated on a basis of a pseudo noise code.

In this case, the radar that can detect the presence or absence of the measurement object with high accuracy and can measure the distance with the simple configuration can be provided.

The transmission section and the reception section may share an antenna. The radar may further has a transmission-reception selector switch and a transmission and reception path control section. The transmission-reception selector switch switches between a state where the transmission section uses the antenna and a state where the reception section uses the antenna. The transmission and reception path control section controls the transmission-reception selector switch in synchronization with a switch period between the first frequency and the second frequency in the transmission wave.

In this cases the radar that can measure the distance with the simpler configuration can be provided.

An integral multiple of a switch period between the first frequency and the second frequency in the transmission wave may equal to a period of the predetermined timing.

In this case, the radar that can measure the distance and can provide stable output with the simple configuration can be provided.

A switch period between the first frequency and the second frequency in the transmission wave may be equal to or larger than a period determined by a code length of the pseudo noise code.

In this case, the radar that can prevent return of power and can measure the distance with the simple configuration can be provided.

The difference frequency between the first frequency and the second frequency may be larger than a Doppler frequency contained in the detection waveform.

In this case, the radar that can measure the distance and the speed highly accurately with the simple configuration can be provided.

A switch period between the first frequency and the second frequency in the transmission wave may be set to avoid the difference frequency between the first frequency and the second frequency.

In this case, the radar that can measure the distance highly accurately with the simple configuration can be provided.

DETAILED DESCRIPTION OF THE PREFERRED EMBODIMENTS

Referring now to the accompanying drawings, there is shown a preferred embodiment of a radar according to an embodiment of the invention.

EMBODIMENT

Figure 1:
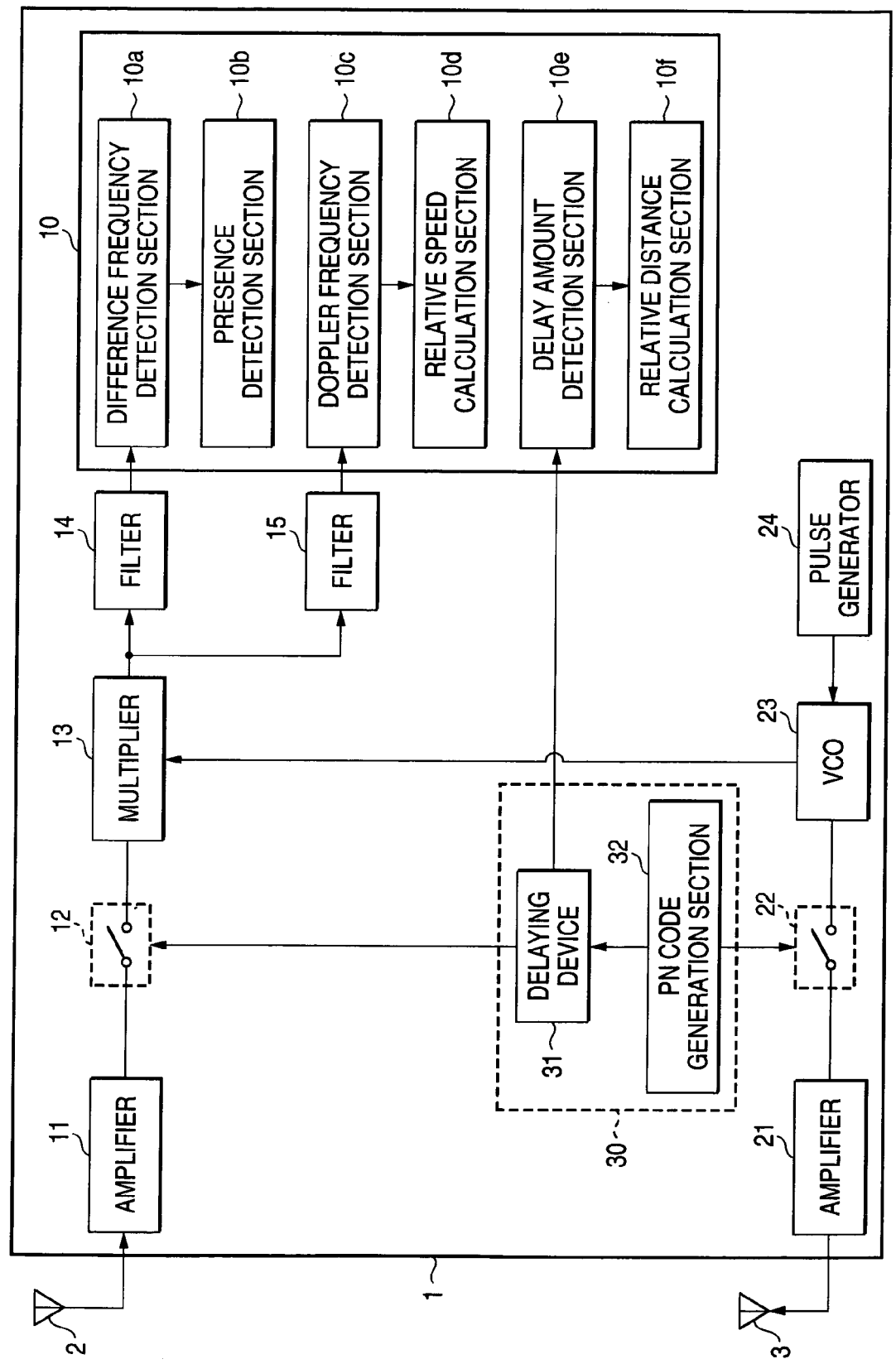
FIG. 1 is a schematic block diagram to show a schematic configuration of a radar according to an embodiment of the invention.

FIG. 1 is a schematic block diagram to show a schematic configuration of a radar according to the invention. As shown in the figure, a radar 1 is connected to a reception antenna 2 and a transmission antenna 3, and has a microcomputer 10, amplifiers 11 and 21, switches 12 and 22, a multiplier 13, filters 14 and 15, a VCO (voltage-controlled oscillator) 23, a pulse generator 24, and a switch control section 30.

The pulse generator 24 generates a pulse signal whose voltage value is switched in a predetermined cycle and outputs the pulse signal to the VCO 23. The VCO 23, which is a voltage-controlled oscillator, outputs a signal of a frequency corresponding to the applied voltage. Thus, if the pulse generator 24 switches alternately between two voltage values V1 and V2 and outputs them, the VCO 23 outputs a waveform switching alternately betweens frequencies f1 and f2 corresponding to the voltage values V1 and V2.

The VCO 23 outputs the waveform switching alternately betweens the frequencies f1 and f2 to the switch 22 and the multiplier 13 as a transmission wave. The switch 22 operates under the control of the switch control section 30. When the switch 22 is turned on, it allows the transmission wave to be output to the amplifier 21.

The amplifier 21 amplifies the waveform output through the switch 22 and emits the amplified signal as a transmission wave from the transmission antenna 3. The transmission wave is reflected by a measurement object and the reflected wave is received at the reception antenna 2.

The reception antenna 2 outputs the received reflected wave to the amplifier 11. The amplifier 11 amplifies the reflected wave received at the reception antenna 2 and supplies the amplified signal to the switch 12. The switch 12 operates under the control of the switch control section 30. When the switch 12 is turned on, it allows the reflected wave to be output to the multiplier 13.

The multiplier 13 generates a difference waveform between the transmission wave and the reflected wave, and outputs the difference waveform to the filters 14 and 15 as a detection waveform.

The filter 14 is a band-pass filter for selectively allowing waveform corresponding to difference frequency between the frequencies f1 and f2 among the detection waveforms to pass through. The filter 14 filters the output from the multiplier 13 and then supplies the filtered output to the microcomputer 10.

On the other hand, the filter 15 is a band-pass filter for selectively allowing frequency corresponding to a Doppler component among the detection waveforms to pass through. The filter 15 filters the output from the multiplier 13 and then supplies the filtered output to the microcomputer 10.

The switch control section 30 for controlling the operations of the switches 12 and 21 contains a delaying device 31 and a PN code generation section 32. The PN code generation section 32 is a processing section 32 for generating a PN (pseudo noise) code. The switch control section 30 performs on/off control of the switch 22, namely, on/off control of the transmission path in accordance with the PN code generated by the PN code generation section 32.

The delaying device 31 performs processing of delaying the PN code generated by the PN code generation section 32. The switch control section 30 also performs on/off control of the switch 12, namely, on/off control of the reception path in accordance with the delayed PN code.

Thus, only if a delay amount given to the PN code is equal to the delay time until the transmission wave is reflected by the measurement object and is received as the reflected wave, the reflected wave is supplied to the multiplier 13; if no reflected wave exists or if the delay amount of the PN code does not match the delay time of the reflected wave, the reflected wave is not supplied to the multiplier 13.

When an arbitrary delay amount is given to the PN code, the presence or absence of an object in the range corresponding to the delay amount can be known. Further, when the delay amount is changed and the delay amount for enabling the reflected wave to be taken out is searched for, the distance to the object can be measured.

The microcomputer 10 contains a difference frequency detection section 10a, a presence detection section 10b, a Doppler frequency detection section 10c, a relative speed calculation section 10d, a delay amount detection section 10e, and a relative distance calculation section 10f.

The difference frequency detection section 10a detects whether or not the waveform output through the filter 14 contains a difference frequency component. The presence detection section 10b determines whether or not a measurement object exists based on the detection result by the difference frequency detection section 10a.

The detection waveform output by the multiplier 13 is the difference between the transmission wave and the reflected wave. However, the reflected wave contains the delay time until the transmission wave is reflected on the measurement object and the reflected wave is received. Thus, a lag as much as the delay time occurs between a timing at which the transmission wave switches between the frequencies f1 and f2 and a timing at which the reflected wave switches between the frequencies f1 and f2. During this lag, the detection waveform contains the difference frequency component between the frequencies f1 and f2.

Further, the transmission path and the reception path are switched based on the PN code and the delayed PN code.

Thus, if a difference frequency component is detected from the detection waveform, it can be concluded that a measurement object exists in a range-corresponding to the delay amount at that time point.

The Doppler frequency detection section 10c detects whether or not the waveform output through the filter 15 contains a Doppler frequency component. The relative speed calculation section 10d calculates relative speed to a measurement object from the frequency of the Doppler component.

If an object being measured has relative speed to the radar 1, a frequency shift occurs in the reflected wave due to the Doppler phenomenon. Thus, when the multiplier 13 calculates the difference between the transmission wave and the reflected wave, the frequency of the Doppler frequency component appears in the detection waveform. The filter 15 selectively allows the Doppler frequency component to pass through, so that the shift amount of the frequency is detected based on the frequency detected from the output of the filter 15, and the relative speed can be calculated from the shift amount.

For example, in a radar installed in a vehicle, it is assumed that relative speed to a measurement object falls within a range of about 0 km/hour to about 200 km/hour. Therefore, the frequency characteristic of the filter 15 may be set to the band corresponding to the assumed speed.

The delay amount detection section 10e detects the delay amount given to the PN code by the delaying device 31. The relative distance calculation section 10f calculates the relative distance to an object based on the delay amount detected by the delay amount detection section 10e.

Since the transmission path and the reception path are switched in accordance with the PN code and the delayed PN code, if a difference frequency component is detected from the detection waveform, the delay amount at that time point corresponds to a distance to a measurement object, as already described. Therefore, the relative distance to the measurement object can be calculated from the delay amount.

Next, various waveforms in the radar 1 will be further discussed with reference to FIG. 2. As shown in the figure, the frequency of a transmission wave S1 switches between f1 and f2 periodically. Likewise, the frequency of a reflected wave S2 also switches between f1 and f2 periodically. However, the reflected wave S2 contains delay time dependent on a distance to a measurement object. Thus, lag as much as the delay time occurs in the frequency switching timing.

Therefore, when the multiplier 13 generates the difference waveform between the transmission wave S1 and the reception wave S2, in the generated detection waveform S3, the difference frequency between the frequencies f1 and f2 occurs during the frequency switching timing lag between the transmission wave S1 and the reception wave S2.

The difference frequency component S4 is determined by the frequencies f1 and f2. Thus, the difference frequency component S4 can be easily detected without being influenced from a distance to the measurement object and speed of the measurement object.

Further, the time length in which the difference frequency component S4 is generated is equal to the lag between the frequency switching timing of the transmission wave S1 and that of the reception wave S2, namely, the delay time of the reception wave S2. Thus, as a relative distance to a measurement object is longer, the generation time period of the difference frequency component S4 gets longer.

Generally, in radar measurement, as a relative distance to a measurement object is longer, the strength of the reflected wave is lowered and the SN ratio (signal-to-noise ratio) is degraded. However, in the radar according to the embodiment, as the relative distance to a measurement object is longer, the generation time period of the difference frequency component S4 get longer. Thus, even if a measurement object is at a long distance, a good SN ratio can be obtained.

Figure 2:
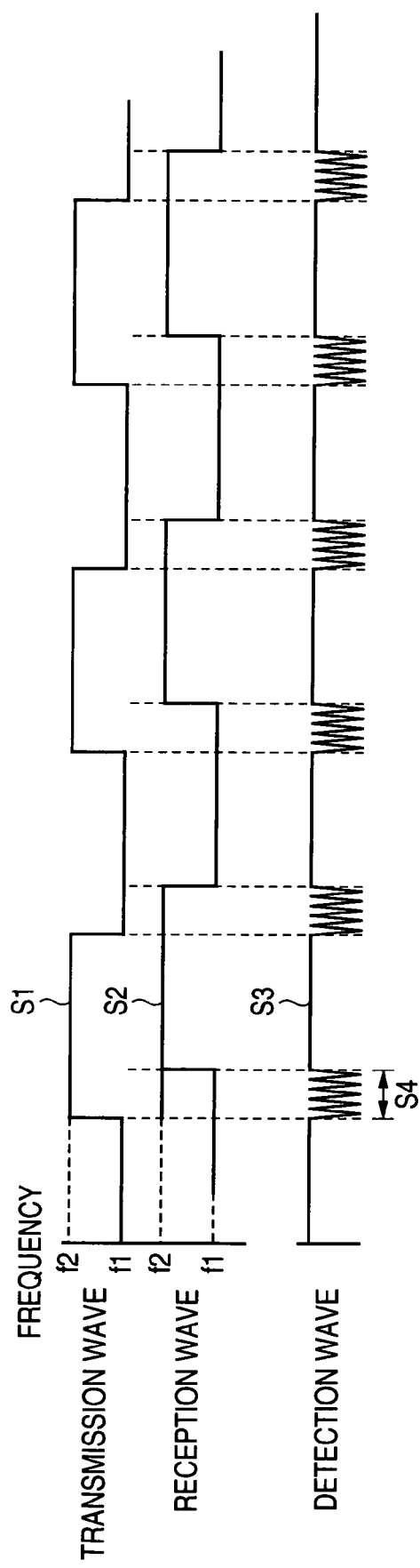
FIG. 2 is a schematic representation to describe various waveforms in the radar shown in FIG. 1.

FIG. 2 shows a state in a case where the operation of the switch 22 in the transmission path and the operation of the switch 12 in the reception path synchronize with each other, namely, a case where the delay amount given to the PN code by the delaying device 31 matches the delay time of the reflected wave. If the delay amount given to the PN code by the delaying device 31 does not match the delay time of the reflected wave, the detection waveform S3 is not obtained.

Figure 3:
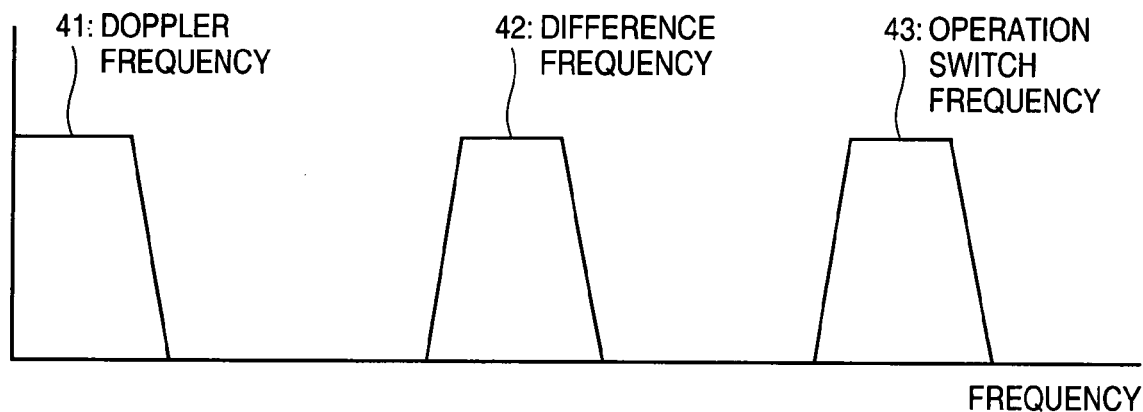
FIG. 3 is a schematic representation to describe settings of Doppler frequency, frequencies f1 and f2, and switch frequency between switches based on PN code.
Figure 4:
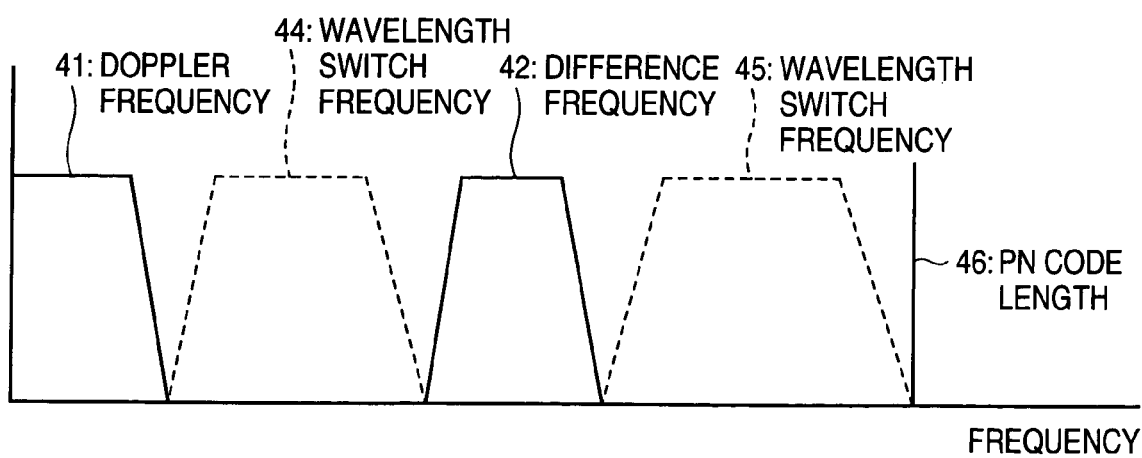
FIG. 4 is a schematic representation to describe the switching period between the frequencies f1 and f2 in a transmission wave.

Next, frequency settings of various waveforms in the radar 1 will be discussed with reference to FIGS. 3 and 4. FIG. 3 is a schematic representation to describe the relationships among the Doppler frequency, the frequencies f1 and f2, and the switch frequency of the switches 12 and 22 in accordance with the PN code.

As shown in the figure, a Doppler frequency 41 is a comparatively low frequency band and the frequencies f1 and f2 are set so that a difference frequency 42 therebetween becomes large as compared with the Doppler frequency 41. Further, the frequencies f1 and f2 are set so that the difference frequency 42 therebetween becomes low as compared with the switch frequency of the switches 12 and 22 based on the PN code (operation switch frequency 43).

The frequencies f1 and f2 are thus set so that the difference frequency 42 becomes a frequency different from the Doppler frequency 41. Therefore, the frequency caused by the Doppler phenomenon can be easily identified among the frequency components contained in the detection waveform. Thus, the configuration of the filter 14, 15 is simplified. Also, the presence detection of a measurement object and the calculation of the relative speed can be accomplished with good accuracy.

Since the component of the switch frequency of the switches 12 and 22 based on the PN code appears in the reflected wave, it is preferable that the difference frequency 42 and the operation switch frequency 43 are set to different values.

Any desired values can be used as the frequencies f1 and f2 if the frequencies satisfy such conditions. More preferably, the frequencies f1 and f2 are set to values for enabling oscillation easily and at low cost and so that the difference frequency becomes a value for facilitating detection processing.

Next, the switching period between the frequencies f1 and f2 in the transmission wave will be discussed with reference to FIG. 4. The switching period between the frequencies f1 and f2 (wavelength switch frequency) is set low as compared with the frequency determined by a PN code length 46, as shown in FIG. 4. The switching period between the frequencies f1 and f2 is set high as compared with the Doppler frequency 41 and to avoid the difference frequency 42.

Wavelength switch frequency 44, 45 is thus set less than the frequency determined by the PN code length 46, so that occurrence of return of power can be prevented and stable output can be provided. The wavelength switch frequency 44, 45 are set to avoid the difference frequency 42, so that the difference frequency 42 can be distinguished from the detection waveform.

Further, it is preferable that the wavelength switch frequency is set to an integral multiple of the operation switch frequency. Transmission and reception are performed with integral number of the frequencies f1, f2 within the time of the on/off operation of the switch 12, 22, whereby the effect of stabilizing output can be provided.

By the way, the configuration shown in FIG. 1 is an example of the use of the invention and various modifications of the configuration can be made without departing from the scope of the invention. For example, in the radar 1 shown in FIG. 1, the transmission antenna and the reception antenna are provided separately, but an antenna may be shared between transmission and reception.

Figure 5:
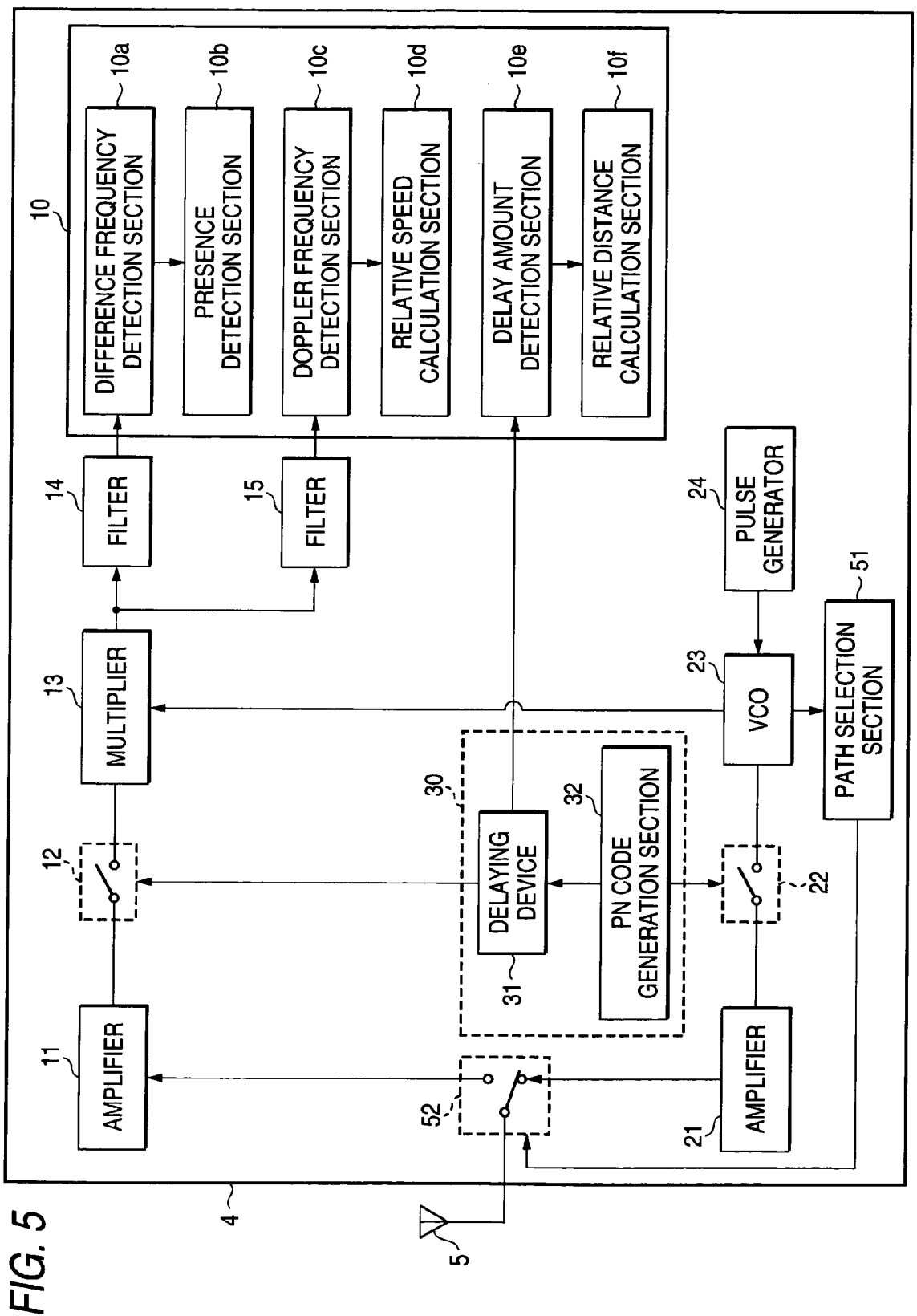
FIG. 5 is a block diagram to show a schematic configuration of a radar with an antenna shared between transmission and reception.

FIG. 5 is a diagram to show a schematic configuration of a radar 4 with an antenna shared between transmission and reception. As shown in the figure, the radar 4 has a transmission-reception antenna 5, a switch 52 for switching between transmission and reception in the transmission-reception antenna 5, and a path selection section 51 for controlling the operation of the switch 52. Other components and operation are similar to those of the radar 1 shown in FIG. 1 and therefore components identical with those of the radar 1 previously described with reference to FIG. 1 are denoted by the same reference numerals and will not be discussed again.

The path selection section 51 controls the switch 52 for selecting connection of the transmission-reception antenna 5 to the transmission path or the reception path. At this time, the path selection section 51 monitors output of a VCO 23 and synchronizes the operation timing of the switch 52 with the wavelength switch period in the transmission wave.

The wavelength switch period and the operation timing of the switch 52 are thus synchronized with each other, so that a transmission wave having integral number of frequencies f1, f2 can be emitted and output can be stabilized.

As a modification of the invention, to use a transmission-reception shared antenna, for example, the function provided by the switches 12, 22, and 52 may be provided by a single switch. To do so, a configuration wherein the transmission-reception shared antenna is connected to the transmission path in accordance with PN code at the transmission time and is connected to the reception path in accordance with PN code with a delay at the reception time can be used.

In the radars 1 and 4 shown in FIGS. 1 and 5, the transmission path and the reception path are turned on and off by the switches 12 and 22 provided in the paths; however, for example, the amplifiers may be implemented as variable amplifiers and the amplification factor may be controlled for turning on/off the transmission and reception paths substantially.

As described above, in the embodiment, a transmission wave is provided by periodically switching between the two frequencies f1 and f2 and when the transmission wave is transmitted, switching control is performed based on the PN code and when the reflected wave is received, switching control is performed based on the delayed PN code. Further, if the detection waveform of the difference between the transmission wave and the reflected wave contains the difference frequency between the frequencies f1 and f2, it is determined that the measurement object exists in the range corresponding to the delay amount.

Therefore, it is made possible to arbitrarily preset the difference frequency of the waveform to be detected and presence detection and distance measurement of the measurement object can be accomplished in the simple configuration and at low cost.

As described above, the radar according to the invention is useful for measuring the relative distance and particularly is suitable for a radar which needs to have a simple configuration and needs to be manufactured at low cost.

What is claimed is:

1. A radar comprising:
   a transmission section that switches between a first frequency and a second frequency to transmit a transmission wave having one of the first frequency and the second frequency;
   a predetermined schedule generated on a basis of a pseudo noise code;
   a switch period between the first frequency and the second frequency in the transmission wave equal to or larger than a period determined by a code length of the pseudo noise code;
   a reception section that receives a reflected wave of the transmission wave transmitted by the transmission section;
   a transmission switch section that switches between turning-on and turning-off of an operation of the transmission section at the predetermined schedule;
   a delay section that delays the predetermined schedule;
   a reception switching section that switches between turning-on and turning-off of an operation of the reception section according to the predetermined schedule delayed by the delay section;
   a difference frequency processing section that outputs a difference frequency between the transmission wave and the reflected wave as a detection waveform; and
   a calculation section that calculates a distance to an object on a basis of a delay amount, which the delay section gives to the predetermined schedule, when the detection waveform has a difference frequency between the first frequency and the second frequency.

2. The radar according to claim 1, wherein the transmission section and the reception section share an antenna, the radar further comprising:
   a transmission-reception selector switch that switches between a state where the transmission section uses the antenna and a state where the reception section uses the antenna; and
   a transmission and reception path control section that controls the transmission-reception selector switch in synchronization with a switch period between the first frequency and the second frequency in the transmission wave.

3. The radar according to claim 1, wherein an integral multiple of a switch period between the first frequency and the second frequency in the transmission wave is equal to a period of the predetermined schedule.

4. The radar according to claim 1, wherein the difference frequency between the first frequency and the second frequency is larger than a Doppler frequency contained in the detection waveform.

5. The radar according to claim 1, wherein a switch period between the first frequency and the second frequency in the transmission wave is set to avoid the difference frequency between the first frequency and the second frequency.

6. The radar according to claim 1, further comprising:
   a filter that allows the difference frequency between the first frequency and the second frequency to pass through, wherein:
   the difference processing section outputs the detection waveform to the filter;
   the filter outputs a waveform to the calculation section;

the calculation section detects whether or not the waveform output from the filter contains the difference frequency between the first and the second frequency; and when the calculation section detects that the waveform output from the filter contains the difference frequency, the calculation section concludes that the detection waveform has the difference frequency.

7. The radar according to claim 1, wherein the transmission section and the reception section share an antenna.

* * * * *